United States Patent [19]

Novak

[11] 3,755,083

[45] Aug. 28, 1973

[54] METHOD FOR RECOVERING UROKINASE FROM URINE CONTAINING THE SAME

[75] Inventor: Leo J. Novak, New Carlisle, Ohio

[73] Assignee: Rand Laboratories, Inc., Metairie, La.

[22] Filed: Aug. 30, 1971

[21] Appl. No.: 176,315

[52] U.S. Cl. .............................. 195/66 B
[51] Int. Cl. ............................. C07g 7/026
[58] Field of Search ....................... 195/66 B

[56] References Cited
UNITED STATES PATENTS
3,477,913  11/1969  Sloane .............................. 195/66 B OTHER PUBLICATIONS
Bergstrom, Arkiv for Kemi, Vol. 21, No. 48, pages 535–546 (1963).

Primary Examiner—Lionel M. Shapiro
Attorney—Dean S. Edmonds, Clyde C. Metzger et al.

[57] ABSTRACT

"This invention relates to a method for recovering urokinase from urine containing the same" with—A method for recovering urokinase from urine containing the same is disclosed:

a. forming a slurry of the urine at a pH between about 3.0 and 6.0 with a non-reactive, water insoluble mineral adsorbant having a large particle surface area and a surface pH between about 3.0 and 5.5;
b. recovering the urokinase-containing adsorbant from the slurry;
c. recovering the urokinase from the urokinase-containing adsorbant in the form of an aqueous solution of urokinase; and
d. recovering the urokinase from the solution.

8 Claims, No Drawings

3,755,083

METHOD FOR RECOVERING UROKINASE FROM URINE CONTAINING THE SAME

BACKGROUND OF THE INVENTION

1. Field of the Invention

This invention relates to a method for recovering substantially pure urokinase, a proteolytic enzyme activator for dissolving blood clots in vivo, which enzyme exists in human male urine in trace amounts (approximately 0.1 mg/liter).

2. Description of Prior Art

Urokinase is a thrombolytic proteolytic enzyme activator which stimulates the production in the blood of the clot-dissolving proteolytic enzyme, plasmin. Urokinase is indicated in the treatment of persons having various circulatory disorders which would cause the formation of clots. Urokinase is also indicated in the treatment of surgical patients both before surgery and postoperatively.

Human male urine provides an excellent and plentiful source of urokinase and a method which would allow for its removal quickly and efficiently is highly desirable. However, the fact that urokinase is present in urine in trace amounts has, until recently, made this source for the enzyme impractical from an economical standpoint.

It is well known that urokinase is susceptible to adsorption on various materials such as bentonite and methods have been described for its elution therefrom. See, for example, Lesuk U.S. Pat. No. 3,555,361 patented Nov. 28, 1967. Chemical methods for the extraction of urokinase hae been described in U.S. Pat. No. 2,989,440 patented June 20, 1961 employing benzoic acid and in U.S. Pat. 2,292,841 patented Aug. 11, 1942 employing tannic acid. Similarly, see U.S. Pat. Nos. 3,477,910, 3,477,911 3,477,912 and 3,477,913 with respect to the disclosure of various means of concentrating and purifying urokinase.

SUMMARY OF THE INVENTION

This invention provides a method whereby urokinase is conveniently and efficiently extracted from urine upon a colloidal dispersion of a mineral adsorbant the nature of which is such that it provides for the further necessary elution and recovery of the uorkinase therefrom in a relatively few simple, yet effective steps.

The method of this invention comprises:

a. forming a slurry of the urine at a pH between about 3.0 and 6.0 with a non-reactive, water insoluble mineral adsorbant having a large particle surface area and a surface pH between about 3.0 and 5.5;

b. recovering the urokinase-containing adsorbant from the slurry;

c. recovering the urokinase from the urokinase-containing adsorbant in the form of an aqueous solution of urokinase; and d. recovering the urokinase from the solution.

DESCRIPTION OF THE PREFERRED EMBODIMENTS

According to the present invention, the source for the urokinase is human male urine which has been adjusted to a pH of between about 3.0 and 6.0 with a suitable acid, advantageously, sulfuric or hydrochloric acid.

A mineral adsorbant is then added to the adjusted urine at a level between about 0.2 to 2.0 gm/liter or urine.

The mineral adsorbants of this invention are selected from amongst a wide group of high surface area adsorbants including silicon dioxide, titanium dioxide and naturally occurrring kaolin clay. Advantageously, colloidal dispersions of such adsorbants may be employed in the process of this invention. It has been found that Cab-O-Sils and Cab-O-Ti, respectively, the highly purified grades of silicon dioxide and titanium dioxide available from the Cabot Corporation, Boston, Mass., and Barden, a naturally occurring South Carolina hard clay available from the J. M. Huber Corp., Edison N.J., are especially advantageous in the process of this invention.

The surface area of the useful mineral adsorbants is within the range from about 50 m$^2$/gm to 400 m$^2$/gm and advantageously 200 m$^2$/gm.

The surface pH of the mineral adsorbants of this invention is between about 3.0 and 5.5.

The following table illustrates the effect of urine pH on urokinase recovery.

TABLE I

Influence of Adjusted Urine pH on Adsorption of Urkinase Using Cab-O-Sil M-5 Stirred in the Urine for 15 minutes.

| Urine pH adjusted Assay of CTA Units at 25°C with 0.5 gm HCl | in Urine After Adsorption | Assay of CTA Units in Eluate |
|---|---|---|
| 4.0 | 0 | 10,000 |
| 5.0 | 0 | 10,500 |
| 6.0 | 5,000 | 5,000 |
| 8.0 | 12,000 | 0 |
| 9.0 | 10,000 | 0 |

The urine/mineral adsorbant slurry is stirred for a suitable period of time, generally on the order of 10–30 minutes. In the event foaming occurs, it is advantageous to add an appropriate amount of an anti-foaming agent such as a silicone anti-foaming agent of the aerosol type. The mineral adsorbant/urokinase adsorbate is then separated from the urine by conventional means such as a centrifuge equipped for continuous operation.

Urokinase can be efficiently separated from the mineral adsorbant/urokinase adsorbate with a conventional extraction agent, for example, a tris buffer (hydroxymethyl aminomethane buffer) solution.

The clear extract which is recovered will contain from 80–99 percent of the urokinase present in the urine.

The following examples illustrate the process of this invention. Since urokinase is adsorbed on glass surfaces, the use of glass equipment should be minimized or the urokinase otherwise protected from such adsorption.

EXAMPLE 1

One liter of freshly voided urine having a pH of 5.5 to 6.0 was further acidified with 0.5N HCl to a final pH of 5.0. To the adjusted urine was added 0.5 gm of Cab-O-Sil M-5 (surface area 200±25 m$^2$/gm, surface pH (4 percent aqueous dispersion) 3.5 – 4.2) and the mixture stirred for about 10 minutes and then centrifuged 10 minutes at 2,000 r.p.m.

The clear supernatant urine was decanted and the orange-brown Cab-O-Sil M-5/urokinase adsorbate sediment was shaken with 100 ml. of a 0.05 molar tris buffer having a pH of 8.0 for 5 minutes. The mixture was centrifuged for 10 minutes at 2,000 R.P.M. and the clear supernatant solution decanted. The supernatant assayed 9,500 CTA units of urokinase while the urine had less than 500 CTA units of urokinase according to the analytical method set forth by S. Sherry in J. Lab & Clin. Med. July, 1964, pages 145 et seq.

EXAMPLE 2

Proceeding in the same manner as in EXAMPLE 1, except that the adsorbant employed was Barden clay (surface pH of 100 gm/200 ml water is between 4.5 and 5.5), 95 percent urokinase activity was attained from urine previously adjusted to pH 4.8.

EXAMPLE 3

A 50 percent aqueous solution of HCl was added at 30°C to 366 liters of urine which had been collected within 24 hours, adjusting the pH of the urine from 8.8 to 5.0. 163 grams of Cab-O-Sil M-5 were then added to the urine and the mixture was stirred for 30 minutes after which it was pumped through a laboratory Sharples supercentrifuge, a step which took about 1 hour. The Cab-O-Sil M-5/urokinase absorbate sediment was removed from the supercentrifuge, placed in a glass container and the container was placed in ice for 24 hours.

The urokinase was extracted at 50°C with tris buffer having a pH of 9.0 for a period of 30 minutes resulting in an extraction volume of 3,660 ml containing 3 ½ million CTA units of urokinase activity or over 95 percent recovery of urokinase activity from the urine.

Cab-O-Sil M-5 it has been found, adsorbs urokinase to such an extent that one may advantageously wash the Cab-O-Sil/urokinase adsorbate with distilled water or a buffer solution, such as tris buffer having a pH of about 7.5 without significant loss of urokinase but with significant removal of protein impurities as shown in the following table.

TABLE II

Influence of Water Washings of Resuspended Cab-O-Sil M-5/Urokinase Slurry Obtained from 200 Liters of Urine On the Removal of Urokinase and Protein $A_{280}$ Impurities.

| Volumes of Water per volume of Absorbate Slurry | Number of Sequential Washings | Average Urokinase CTA's Removed in % (Based on 10,000 CTA units/liter urine and 100% Adsorption efficiency) | Protein $A_{280}$ Removed in grams |
| --- | --- | --- | --- |
| 10 | 1 | 1.0 | 58 |
| 10 | 2 | 0.25 | 42 |
| 10 | 3 | 0.15 | 25 |
| 10 | 4 | .05 | 5 |

It has been discovered that with the addition to the extraction agent of a suitable salt such as sodium chloride, the sodium phosphates and advantageously, ammonium sulfate, a a level of about 10–30 percent by weight to the adsorbate slurry, urokinase is substantially quantitatively extracted in a stable condition and at an improved S/A (specific activity) as illustrated in the following table. Moreover, extraction with the aforesaid salts suppresses the solubilization of the mineral adsorbant.

TABLE III

The Influence of Ammonium Sulfate In Tris Buffer at pH 10.0 On the Extraction of Urokinase and Impurities From Washed Cab-O-Sil/Urokinase Absorbate

| Tris buffer molarity | Volume percent of saturated $(NH_4)_2 SO_4$ added to tris | Urokinase CTA's extracted in ml | Protein $A_{280}$ mg/ml | Urokinase S/A |
| --- | --- | --- | --- | --- |
| 0.0475 | 5.0 | 670 | 5.7 | 117 |
| 0.045 | 10.0 | 1000 | 4.6 | 217 |
| 0.04 | 20.0 | 1000 | 2.3 | 435 |
| 0.033 | 30.0 | 1500 | 2.7 | 550 |
| 0.025 | 50.0 | 100 | 3.2 | 31 |

Additional inorganic salt is then added to the urokinase extracts to precipitate the urokinase. The urokinase is then removed by conventional means such as by centrifugation. The urokinase thus obtained is advantageously redissolved and the acid insoluble proteins contained in the urokinase solution precipitated by means of a suitable acid such as hydrochloric acid.

It is important during the precipitation of acid insoluble proteins to maintain the content of $A_{280}$ protein in the range of 5–25 mg/ml. If the $A_{280}$ protein is present in less than 5 mg, the urokinase may precipitate at pH 2.0 along with the acid insoluble protein. The protein precipitate is removed in the usual manner and the urokinase solution adjusted to a pH of about 4.5 – 5 and left standing until no more urokinase precipitate is formed.

The following table illustrates the effectiveness of acid precipitation of protein impurities from the redissolved urokinase.

TABLE IV

The Influence of Acid Precipitation of Protein Moieties From Redissolved Urokinase

| $A_{280}$ protein, mg./ml. | | CTA/ml. | | S/A | |
| --- | --- | --- | --- | --- | --- |
| Before acid (pH 2.0) | After acid (pH 2.0) | Before acid precipitation | After acid precipitation | Before acid precipitation | After acid precipitation |
| 17 | 10 | 25,000 | 25,000 | 1,470 | 2,500 |
| 25 | 13 | 27,500 | 25,500 | 1,100 | 1,923 |
| 5 | 2 | 12,000 | 300 | 1,200 | 60 |

The urokinase is then advantageously subjected to further purification utilizing an anionic polysaccharidal exchanger such as diethylaminoethyl (DEAE) dextran anionic exchanger, depyrogenated by ultrafiltration and finally, lyophilized.

The following example illustrates another embodiment of this invention.

EXAMPLE 4

A. Preparing the Urine/Mineral Absorbant Slurry

The urine which advantageously is not more than about 24 hours old, is pooled in a large tank, volume and pH noted, and the pH adjusted, if necessary, to between about 4.5–5.5 with 2.0 N sulfuric acid accompanied by moderate stirring. Should foaming occur, an effective amount of a silicone aerosol type antifoaming agent may be added. Cab-O-Sil M-5 is added to the urine at a rate of 0.25 to 0.5 gram per liter of urine and stirred for about 30 minutes.

B. Separating the Mineral Adsorbant/Urokinase from the Slurry

After stirring for about 30 minutes, the urine/adsorbant slurry is passed through a Sharples supercentrifuge to obtain the Cab-O-Sil/urokinase adsorbate which usually contains 95–99.9 percent of the urinary urokinase moieties. The urinary effluent is discarded. If necessary or desirable, the Cab-O-Sil/urokinase slurry may be frozen and stored awaiting further processing.

C. Urokinase With Water

The Cab-O-Sil M-5 urokinase adsorbate is removed from the supercentrifuge and resuspended in pure cold water at a rate of 10-50 ml of water per liter of urine treated, then recentrifuged. This procedure is repeated twice, if necessary, to remove most of the unadsorbed or loosely bound color and impurities. At 50 ml water wash per liter of adsorbed urine, no more than two washes are required to get the $A_{280}$ proteins down to a minimum in the water washings. The washed adsorbate is added to enough tris buffer 0.05 molar, pH 7.5, to give a thick stirrable slurry and this slurry is then frozen in polyethylene containers and shipped in insulated boxes with ice to the central processing laboratory. Usually a week's collection is stored frozen and shipped as such at the end of the week.

D. Separating the Urokinase from the Washed Mineral Adsorbant/Urokinase Adsorbate by Extraction The frozen solution of this buffer urokinase adsorbate is thawed, mixed and volume and pH recorded. The pH is usually between 5 to 9.5 depending upon such factors as storage and shipping time, bacterial, enzymatic proteolytic action, etc. The slurry is maintained at 4°–5°C and to it is added enough ice cold 0.05 molar, pH 10.4 tris buffer to give 5 ml total tris buffer per liter of urine.

After stirring until mixed, the pH is adjusted to 10.0 (advantageously with ice cold ammonium hydroxide) and enough saturated ammonium sulfate added (5°C) to result in a 30 percent saturation. This is based on the slurry volume including the solid adsorbate volume. pH is then readjusted to 10.0.

After stirring for ¼ – 1 hour, the slurry is centrifuged at 4°–5°C at 10,000 r.p.m. for 5–10 minutes.

The extracts are combined and kept cold and assayed for protein and CTA's of urokinase. This extraction is repeated to give a second extraction. A third extraction is generally not necessary.

These extracts contain urokinase at a S/A averaging 400-600, and urokinase recovery of from about 90-98 percent based on starting urine. The Cab-O-Sil M-5 adsorbate sediment is discarded.

Enough additional ice cold saturated ammonium sulfate is added to the combined extracts to provide between about 40–50 percent saturation (on the average 45 percent). The mixture is allowed to precipitate for at least an hour (overnight at 4°–5°C has been found to be advantageous).

The solution containing the urokinase precipitate is centrifuged at 10,000 r.p.m. for 10 minutes. The supernatant which contains an insignificant quantity of urokinase is discarded. It should, however, always be checked for CTA's.

E. Separating the Acid-Insoluble Proteins in Redissolved Urokinase

The sediment from step D containing the urokinase is redissolved in a minimum volume of ice cold 0.05 molar, pH 10.4 Tris. This urokinase should have a S/A of 1000–3000.

If the redissolved urokinase is not clear, it should be centrifuged at 4°–5°C at 15,000 r.p.m. for 10–15 minutes. The clear, ice cold solution of urokinase is then placed in a polyethylene beaker equipped with a teflon coated magnetic stirrer. It should contain between 4–25 mg $A_{280}$ protein per ml. The solution is then diluted with ice cold 0.05 molar, pH 10.4 tris buffer to proper concentration (10–20 mg. is preferred for $A_{280}$ protein).

With stirring, slowly add ice cold hydrochloric (one-fourth volume of cold concentrated HCl to three-fourths volume of finely crushed pure ice) to pH 2.0. Do not permit the temperature to rise above 15°C. Allow the precipitation to develop for 10–15 minutes at 4°–5°C.

Centrifuge the solution containing the acid-insoluble protein precipitated at (5°C) at 15,000 r.p.m. for 10 minutes. Remove the supernatant and discard the acid insoluble sediment. The resulting urokinase solution generally has a S/A of 1500–4000.

F. Separating the Urokinase from Solution

The urokinase solution is adjusted to pH 4.5–5.0 with ice cold 1.0 N NaOH with stirring, and left standing at 4°–5°C until the formation of urokinase precipitate is no longer observed. The liquid is then cold centrifuged at 10–15,000 r.p.m. for 10 minutes and supernatant discarded.

G. Dialyzing the Urokinase Solution

The urokinase precipitate from step F is dissolved in a minimum volume of 0.05 molar tris buffer of pH 7.5. The urokinase solution is dialyzed against 20–30 volumes of 0.05 molar tris buffer of pH 7.5 at 4°–5°C for 18–24 hours. This removes excess inorganic ions and traces of low molecular weight soluble impurities. The urokinase impermeate usually has a S/A of 15–5000.

H. Adsorption of the Urokinase Upon An Anionic Polysaccharidal Exchanger

The object of this step is to remove color and increase urokinase - S/A. The urokinase solution from step G, if not perfectly clear, is cold centrifuged and the clear cold supernatant is adjusted if necessary to contain no more than 10 mg $A_{280}$ protein per ml with 0.05 molar pH 7.5 Tris. The S/A should preferably be over 200 to attain efficient adsorptive treatment with an anionic polysaccharidal exchanger such as Sephadex.

Sephadex A50 is a cross linked diethylaminoethyl (DEAE) dextran anionic exchanger supplied by Pharmacia Fine Chemicals, Inc., New Market N. J.. Sephadex A50 also functions as a selective gel permeation separator for different sized macromolecules. It may be used in the chloride form just as it is supplied. Prior to use, Sephadex A50 is equilibrated with 0.05 molar pH 7.5 tris buffer. 100 gms of Sephadex A50 is added to 16–20 liters of the tris buffer and mixed slowly for 6–8 hours or overnight. Just before use, the equilibrated Sephadex A50 is suction filtered on a No. 8 or No. 9 Ertel pad in a Buchner funnel.

Dilute the urokinase solution from step L to 5 mg $A_{280}$ protein per ml with cold 0.05 molar, pH 7.5 Tris.

Add 50 mg (dry basis) of the A50 Sephadex slush for every 5 mg $A_{280}$ urokinase protein. Stir at 4°–5°C gently but thoroughly in a polyethylene container for 1 ½ – 2 hours, then filter and filter wash the Sephadex A50 with a volume of 0.05 molar, pH 7.5 tris buffer equal to half the Sephadex volume. Repeat once and combine the filtrates. The combined filtrates should be nearly colorless, and contain about 75 percent of the urokinase with a S/A between 15,000–30,000.

The Sephadex A50/Urokinase adsorbate is extracted by stirring at 4°–5°C for 30 minutes with an equal volume of 0.02 molar Versene, a salt of ethylene diaminetetracetic acid supplied by the Dow Chemical Co., Midland Mich., and is prepared by adding 0.5M of the salt to 0.05 molar tris buffer of pH 7.5. After filtering, the Sephadex A50 is filter washed again with a half volume of the Versene tris buffer solution. THe filtrates are combined and urokinase moieties are then precipitated with ammonium sulfate, centrifuged, redissolved with pH 10.4, .05 molar tris buffer and dialyzed as in step G.

This urokinase can now be recycled through the Sephadex A50 by the batch method described in this subsection.

I. Purifying Urokinase by Column Fractionation

Moist D.E.A.E. — cellulose (D.E.A.E.-C) in the free base form, free of excess hydroxyl ions and counter ions, is stirred into 10-11 volumes of 0.05 molar tris buffer of pH 7.5, and stirred for an hour, filtered and resuspended in 2-3 volumes of fresh pH 7.5, 0.05 molar tris buffer and then stored in a cold room or refrigerator within a clean closed container. It is filtered and washed once with the same cold pure tris buffer just before using.

At this point and all subsequent operations, scrupulous cleanliness, pyrogen free water and aseptic technique and important to remove additional urokinase impurities, increase S/A. decrease bacterial and pyrogen contaminations.

A 2 ½ × 30 inch Pyrex glass column with bottom porcelain fritted disc is advantageously employed. It is carefully filled with the tris buffer equilibrated D.E.A.E.-C slurry and periodically drained until 1400–1500 ml of moist properly packed material is added. It is stored in the cold room at 4°–5°C with Tris liquid to the top surface.

Just before use, 1–2 liters of 0.05 molar, pH 7.5, fresh tris buffer (pyrogen free) are passed through the column until the last of the liquid is just even with the top of the D.E.A.E.-C surface.

It is impractical to perform subsequent operations with less than 30 million CTA units of urokinase at a S/A of 10,000 containing 20 mg $A_{280}$ protein and 200,000 CIA units per ml is suitable with a higher S/A even more advantageous. Samples are pooled if necessary from the Sephadex A50 operation to give at least 30 million CIA's in tris buffer, 0.05 molar, pH 7.5, and free of inorganic organic ionic impurities by dialysis as previously described.

To attain a concentration of 20 mg $A_{280}$ protein per ml at 10,000 S/A, the pooled Sephadex A50 samples may be reprecipitated with ammonium sulfate at pH 4.5–5.0, redissolved in 0.5 molar tris buffer and dialyzed as in step G.

The urokinase sample is added to the column slowly without disturbing the top surface. One hundred and fifty ml of tris buffer is drained from the column at a rate of about 1 ml/minute.

Elution is begun with a 0.05 molar, pH 7.5 – 8.0 tris buffer containing 0.3 molar sodium chloride gradient at the same rate of 1 ml/minute.

A 10 ml sample is collected in polyethylene tubes. Samples having a S/A of 50,000 or more are pooled with those having lesser S/A. 0.1 percent sterile human albumin and 0.02% Versene of pH 7.5 are added to the 50,000 S/A pooled samples and the next step is then carried out immediately.

Pooled sample material of less than 50,000 S/A may advantageously be carefully precipitated with ammonium sulfate, centrifuged, redissolved and dialyzed as previously described and then recycled through a freshly prepared D.E.A.E.-C column. Some 15–20 percent loss of urokinase may result from this operation.

J. Dialysis Against Phosphate Buffer at 4°–5°C

The pooled urokinase samples are dialyzed overnight against 30–40 volumes of phosphate buffer of the following composition:

0.01 Molar $NaH_2PO_4$
0.01 Molar $Na_2HPO_4$
0.30 Molar NaCl pH is adjusted to 6.7 with 1.0N HCl or 1.0N NaOH. Pyrogen free distilled water and Versene treated, pyrogen free water washed cellophane tubing is employed.

K. Virus Inactivation Heat Treatment

The urokinase/phosphate salt impermeate of the pooled samples are placed in clean polyethylene, rubber capped tubes, 10 ml per tube, and immersed in a water bath at 60°C for 10 hours, then immediately cooled to 5°C. Generally, only slight (5 percent) losses of urokinase occur from this operation which is directed mainly at destruction of the hepatitis virus, which may still be present.

L. Dialysis Against Versene Salt Solution

The heat treated samples are dialyzed against 30–50 volumes of pyrogen free ice cold 0.1% Versene 0.9 percent salt at pH 6.8 –6.95 for 24 hours at 4°–5°C. Urokinase losses are minimal.

The impermeate is adjusted to the proper CTA content per ml of 0.1 Versene 0.9% salt solution, so that after lyophilization, the desired CTA's per unit vial will be attained.

M. Ultrafiltration Pyrogen Patention

An Ertel EO filter pad is filter washed with a few ml of 10% HCl to remove traces of iron and impurities and then with pyrogen free sterile water until free of chloride ions.

A suitable Gelman or Millipore bacterial retentive filter pad is asceptically assembled in a clean suction funnel and the washed Ertel EO pad is placed on top of the other filter. The assmebly, cooled to 4°–5°C and the Versene salt is sterilized urokinase samples are aseptically ultrafiltered. The Ertel EO pad removes pyrogenic material. The filtrate should be check for pyrogenicity. If negative, proceed to next final processing step.

N. Subdividing Urokinase and Lyophilization

The ice cold ultrafiltered depyrogenated urokinase Versene NaCl fluid is adeptically subdivided into that volume unite containing the desired CTA's of urokinase of S/A over 50,000 per unit. The pH of the solution is aseptically adjusted to 6.9–7.0 if necessary with sterile ice cold 0.1N HCl and the solution frozen in sterile glass vials or containers with sterile slotted rubber lyophilizing stoppers and lyophilized utilizing standard practice to a powder.

The lyophilized urokinase is removed after the rubber stopper has sealed the vacuum in the vial.

The urokinase is maintained under refrigeration until time for use.

I claim:

1. A method for recovering urokinase from urine containing the same which comprises:
    a. forming a slurry of the urine at a pH between about 3.0 and 6.0 with a non-reactive, water insoluble mineral adsorbant having a particle surface area of about 50 m²/gm to 400 m²/gm and a surface pH between about 3.0 and 5.5;
    b. recovering the urokinase-containing adsorbant from the slurry;
    c. recovering the urokinase from the urokinase-containing adsorbant in the form of an aqueous solution of urokinase; and
    d. recovering the urokinase from the solution.

2. The method of claim 1 wherein the adsorbant is added to the urine at a level between about 0.2 to 2.0 gm/liter of urine.

3. The method of claim 1 wherein the adsorbant is silicon dioxide, titanium dioxide or a naturally occurring South Carolina hard clay having a surface area of about 200 m²/gm.

4. The process of claim 1 wherein the urokinase-containing adsorbant of step (b) is resuspended to form a slurry and the slurry washed one or more times with water.

5. The process of claim 4 wherein the recovery step (c) is carried out by extracting the urokinase-containing adsorbant with tris buffer to which sodium chloride, a sodium phosphate or ammonium sulfate salt has been added at a level of about 10–30% by weight of the slurry, centrifuging the slurry and recovering the supernatant liquid containing urokinase dissolved therein.

6. The process of claim 5 wherein the recovery step (d) is carried out by precipitating the acid-insoluble proteins present in the urokinase solution with an additional quantity of salt and recovering the urokinase precipitate.

7. The process of claim 6 wherein the urokinase precipitate is redissolved, the acid-insoluble proteins present in the urokinase solution are precipitated by the addition of a suitable acid precipitant, the supernatant solution containing urokinase is recovered, the urokinase present in the solution is precipitated with a suitable base and the urokinase precipitate is recovered.

8. The process of claim 7 wherein the urokinase precipitate recovered therein is further purified by the steps of
    a. redissolving the urokinase precipitate;
    b. dialyzing the urokinase solution against tris buffer solution;
    c. adsorbing the urokinase upon an anionic polysaccharidal exchanger;
    d. recovering the urokinase from the anionic polysaccharidal exchanger/urokinase adsorbate in the form of an aqueous solution of urokinase.
    e. recovering the urokinase from the solution;
    f. redissolving the urokinase;
    g. dialyzing the urokinase against tris buffer solution;
    h. re-adsorbing the urokinase upon the anionic polysaccharidal exchanger;
    i. recovering the urokinase from the anionic polysaccharidal exchanger/urokinase adsorbant in the form of an aqueous solution of urokinase;
    j. purifying the urokinase present in the aqueous solution by column fractionation;
    k. dialyzing the purified urokinase solution against phosphate buffer.
    l. heating the dialyzed urokinase solution at a temperature and for a period of time sufficient to inactivate any viral organisms present therein;
    m. dialyzing the urokinase solution against a solution of a salt of ethylenediaminetetraacetic acid.
    n. depyrogenating the urokinase solution by ultrafiltration; and
    o. recovering the urokinase from the solution by lyophilization.

* * * * *

PO-1050
(5/69).

UNITED STATES PATENT OFFICE
CERTIFICATE OF CORRECTION

Patent No. 3,755,083　　　　　　　　Dated August 31, 1973

Inventor(s) Leo J. Novak

It is certified that error appears in the above-identified patent and that said Letters Patent are hereby corrected as shown below:

ABSTRACT: Delete portion of first two lines reading "This invention relates to a method for recovering Urokinase from urine containing the same with --"

Column 1, line 33, "hae" should read -- have --.

Column 2, lines 30-33, headings of first two columns (from left) of Table I are incorrect. They should read as follows:

| Urine pH adjusted at 25°C with 0.5 gm HCl | Assay of CTA Units in Urine After Adsorption |
|---|---|

Column 3, line 65, "a a level" should read -- at a level --.

Column 7, line 22, "THe" should read -- The --.

Column 8, line 1, "in 0.5 molar" should read -- in .05 molar --.

Column 8, line 12, "sterile human albumin" should read -- sterile human serum albumin --.

Column 8, line 67, "is adeptically subdivided" should read -- is asceptically subdivided --.

Signed and sealed this 20th day of November 1973.

(SEAL)
Attest:

EDWARD M. FLETCHER, JR.　　　　　RENE D. TEGTMEYER
Attesting Officer　　　　　　　　Acting Commissioner of Patents